(12) United States Patent
Baclawski

(10) Patent No.: US 6,463,433 B1
(45) Date of Patent: *Oct. 8, 2002

(54) DISTRIBUTED COMPUTER DATABASE SYSTEM AND METHOD FOR PERFORMING OBJECT SEARCH

(75) Inventor: Kenneth P. Baclawski, Waltham, MA (US)

(73) Assignee: Jarg Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/509,328
(22) PCT Filed: Jul. 23, 1999
(86) PCT No.: PCT/US99/16925
§ 371 (c)(1), (2), (4) Date: Mar. 23, 2000
(87) PCT Pub. No.: WO00/05663
PCT Pub. Date: Feb. 3, 2000

Related U.S. Application Data

(60) Provisional application No. 60/094,110, filed on Jul. 24, 1998, and provisional application No. 60/094,347, filed on Jul. 28, 1998.

(51) Int. Cl.[7] ............................................. G06F 17/30
(52) U.S. Cl. ............................. 707/5; 707/10; 707/103; 707/104.1
(58) Field of Search ............................. 707/1, 3, 5, 10, 707/103, 104.1

(56) References Cited

U.S. PATENT DOCUMENTS

| | | | |
|---|---|---|---|
| 4,811,199 A | * 3/1989 | Kuechler et al. | 364/200 |
| 5,006,978 A | * 4/1991 | Neches | 364/200 |
| 5,309,359 A | * 5/1994 | Katz et al. | 364/419.19 |
| 5,647,058 A | 7/1997 | Agrawal et al. | |
| 5,655,080 A | 8/1997 | Dias et al. | |
| 5,694,593 A | * 12/1997 | Baclawski | 395/605 |
| 5,926,551 A | 7/1999 | Dwork et al. | |
| 5,931,907 A | 8/1999 | Davies et al. | |

FOREIGN PATENT DOCUMENTS

EP  0882503 A  2/1998

OTHER PUBLICATIONS

Salton, Gerard et al., "Automatic Structuring And Retrieval Of Large Text Files", Communications Of The ACM, Feb. 1994, pp. 97–108, vol. 37, No. 2.

Chakrabarti, Soumen, et al., "Automatic Resource Compilaton by Analyzing Hyperlink Structure and Associated Text", Proceedings 7th International World Wide Web Conference, 1998, <http://decweb.ethz.ch/WWW7/1898/com1898.htm>.

(List continued on next page.)

Primary Examiner—Diane D. Mizrahi
Assistant Examiner—Jacques Veillard
(74) Attorney, Agent, or Firm—Kudirka & Jobse, LLP

(57) ABSTRACT

A distributed computer database system including one or more front end computers and one or more computer nodes interconnected by a network into a search engine for retrieval of objects including images, sound and video streams, as well as plain and structured text. A query is an object in the same format as the objects to be retrieved. A query from a user is transmitted to one of the front end computers which forwards the query to one of the computer nodes, termed the home node, of the search engine. The home node extracts features from the query and hashes these features. Each hashed feature is transmitted to one node on the network. Each node on the network which receives a hashed feature uses the hashed feature of the query to perform a search on its respective partition of the database. The results of the searches of the local databases are gathered by the home node.

28 Claims, 9 Drawing Sheets

OTHER PUBLICATIONS

Jain, Ranesh, "Content–Centric Computing in Visual Systems", in Del Bimbo, Alberto, "Image Analysis and Processing", Lecture Notes in Computer Science, 9th International Conference ICIAP '97, Sep. 1997, pp. 1–31, Proceedings, vol. II, Florence, Italy.

Pirolli, Peter et al., "Silk from a Sow's Ear: Extracting Usuable Structures From the Web", CHI 96, Apr. 13–18, 1996, pp. 118–125, Vancouver, Canada.

Kleinberg, Jon, "Authoritative Sources in Hyperlinked Environment", Proceedings of 9th ACM–SIAM Symposium on Discrete Algorithms, 1998, <http://www.cs.cornell.edu/home/kleinber/auth.pdf>.

Gibson, David et al, "Inferring Web Communities from Link Topology", Proceedings 9th ACM Conference on Hypertext and Hypermedia, 1998, <http://www.cs.cornell.edu/home/kleinber/ht98.pdf>.

Arocena, Gustavo et al., "Applications of a Web Query Language", Hyper Proceedings, Sixth International World Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communications Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", Hyper Proceedings, Sixth International World Wide Conference, <http://decweb.ethz.ch/WWW6/Technical/Paper206/Paper206.html>.

Noy, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta, Yuichi, "Knowledge–Based Inerpretation of Outdoor Natural Color Scenes", Institute of Information Sciences and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996, pp. 652–664.

Santini, Simone, et al., "Image Databases Are Not Databases With Images", in DelBimbo, Alberto, "Image Analysis and Processing", Lecture Notes in Computer Science, 9th International Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retreval of Information by Computer, 1989, pp. 275–366, Addison-–Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predictive Data Mining, A Practical Guide, Morgan Kaufmann Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer Science, Boston, MA Mar. 30, 1994.

Giger, H.P., "Concept Based Retrieval in Classical IR Systems", Proceedings of the International Conference on Research and Development in Information Retrieval, NY, NY, ACM, vol. Conf. 11, pp. 275–289.

Simone Santini et al.; "Similarity queries in image databases"; Proceedings 1996 IEEE Computer Society Conference on Computer Vision and Pattern Recognition; Proceedings of IEEE Conference on Computer Vision and Pattern Recognition, San Francisco, CA, USA Jun. 18–20, 1996, pp. 646–651; XP002127209.

* cited by examiner

| 402 HEADER | 403 QID | 404 HQF | 405 VALUE |

Figure 4a

QUERY MESSAGE

| 406 HEADER | 407 QID | 408 OID | 409 WEIGHT |

Figure 4b

QUERY RESPONSE MESSAGE

| 410 HEADER | 411 QID | 412 OID | 413 TS |

Figure 4c

OBJECT MESSAGE

| 414<br>HEADER | 415<br>QID | 416<br>OID | 417<br>LOCATION |
|---|---|---|---|
| 418<br>FEATURES... | | | |
| 419<br>... | | | |

*Figure 4d*

OBJECT RESPONSE
MESSAGE

| 420<br>HEADER | 421<br>OID | 422<br>HQF | 423<br>VALUE |
|---|---|---|---|

*Figure 4e*

INSERT MESSAGE

| 424<br>HEADER | 425<br>OID | 426<br>TS | 427<br>LOCATION |
|---|---|---|---|
| 428<br>FEATURES... | | | |
| 429<br>... | | | |

*Figure 4f*

INSERT
OBJECT RESPONSE

DISTRIBUTED COMPUTER DATABASE SYSTEM AND METHOD FOR PERFORMING OBJECT SEARCH

RELATED APPLICATIONS

This application is related to and claims priority from copending, commonly assigned U.S. Provisional Applications, Ser. No. 60/094,110, filed Jul. 24, 1998 by Kenneth P. Baclawski, and entitled "Distributed Object Search System and Method"; and Ser. No. 60/094,347, filed Jul. 28, 1998 by Kenneth P. Baclawski, and entitled "Summarization System and Method"; the disclosures of which are incorporated herein by reference.

FIELD OF THE INVENTION

The invention relates to computer database systems and more specifically to distributed computer database systems.

BACKGROUND OF THE INVENTION

As is generally recognized in the art, two of the most significant changes in the nature of information processing in the last decade are the transition from primarily alphanumeric text processing to multimedia processing and the connection of formerly isolated computers by networks, which have been connected in turn by intranets and the Internet. The first change has resulted in computer images becoming as common on computers as text. The second change has resulted in vast quantities of information, both text and multimedia, being accessible to individuals. This increase in information availability to individuals has come at the cost of increasing difficulty in finding relevant information.

a) Word Based Search Engines

Search engines have been developed to assist in information retrieval, but they are still primarily based on matching words in a query with words in text documents. In practice, this means that they cannot typically search effectively for features of images and other kinds of multimedia. Word based systems and non-word based systems presently employ separate and distinct approaches to extract relevant information.

One way of extracting information from a word based database is to submit an information request in the form of a query. Responsive to the query, a computer can extract information from the database that is related to that specified by the query. The extracted information can be used for determining the degree of "similarity" or "relevance" between a query and an object in the database. A variety of computer-implemented similarity measures have been developed for comparing a query with an object in the database when the query and database information are documents in a natural language. A commonly used measure of similarity is the cosine measure. The cosine measure is given by the formula, COS (v, w), where the vector v denotes the query and the vector w denotes the document. These vectors are in a space in which each possible word (or set of synonymous words) represents one dimension of the space. Further information regarding the cosine measure can be had with reference to G. Salton. *Automatic Text Processing*. Addison-Wesley, Reading, Mass., 1989; and G. Salton, J. Allen, and C. Buckley. "Automatic structuring and retrieval of large text files," *Comm. ACM*, 37:97–108, 1994.

b) Non-Word Based Search Engines

As noted above, non-word based techniques currently employ approaches to extracting relevant information that are different and distinct from those used in word based systems. Non-word based information retrieval techniques are utilized advantageously, for example, in the field of medicine for extracting diagnostic information from images of the human body. Lung cancer is one of the most difficult cancers to cure. Early detection is important to improve the recovery rate. Chest CT scans are more effective than conventional chest X-ray techniques, but CT scans result in many more images to be examined, making computer assistance essential for mass screening programs. Computer aided diagnosis of CT images requires the extraction of a large number of features such as the lung area, blood vessels, air clusters and tumors. These features are detected using a computer-implemented thresholding algorithm along with smoothing to remove artifacts of the CT scanner. These features, in turn, have a complex structure involving attributes such as their shape, area, thickness and position within the lung. In implementing such algorithms on a computer for detecting such features, it is useful to employ an object database. An object database is a collection of data or information objects organized and stored on a computer storage medium pursuant to a data model. Each Information object has a type, such as, image, sound or video stream, as well as data object, e.g., text file or structured document. Each information object is identified uniquely by an object identifier (OID). An OID can be an Internet Universal Resource Locator (URL) or some other form of identifier such as a local object identifier. Databases containing images, sound and/or video streams can include not only the information objects themselves but also features and metadata. The data model used for such a database can support the representation of information at many levels of abstraction, including:

1. The data representation level, which contains the actual data of the information object.
2. The data object level, which stores data objects (such as lines and regions) extracted from the information object. The objects on this level do not have a domain interpretation.
3. The domain object level, which associates a domain object with each object at the data object level.
4. The domain event level, which associates domain objects with each other, providing the semantic representation of spatial or temporal relationships.

A feature at the data object level (i.e., at Level 2, above) can be represented as a set of domain-independent data such as lines and regions. A feature at the domain level (i.e., Levels 3 and 4, above) can be represented as a set of domain objects related to one another by domain-dependent relationships.

Consider another example in medicine. Mammography is one of the most effective methods of early detection of breast cancer, one of the leading causes of cancer among women. Manual reading of mammograms is labor intensive, so computer assistance is essential. A very large number of features in mammograms have been identified as being important for proper diagnosis, such as clustered microcalcifications, stellate lesions and tumors. Each of these can be represented as a set of medical domain objects with a complex structure. For example, a stellate lesion has a complex structure, consisting of a central mass surrounded by spicules. The spicules, in turn, have a complex, star-shaped structure. Extracting these complex domain objects and their relationships with each other is important for effective detection of breast cancer.

Features of images, sound and video streams can be represented in a computer system as a set of data structures stored in a database. The features can be categorized into the following types:

Features, such as the name of the photographer or date taken, that cannot be directly extracted from an information object, and are often descriptive of other data regarding the information object. Features of this kind are called metadata.

Features that can be extracted directly from the information object at the time of insertion into the database.

Features that are not calculated until needed.

Features can be as simple as the value of an attribute such as brightness of an image, but many features are more complicated and are thus represented using a complex data structure. An example of such a complicated feature is a representation of the structure of a stellate lesion in a mammogram.

Typically, features can be extracted from structured documents by parsing the document to produce data structures, and can be extracted from unstructured documents by using one of the many feature extraction algorithms that have been developed for implementation on a computer. As in the case of structured documents, feature extraction from an unstructured document produces data structures. A large variety of feature extraction algorithms have been developed for media such as sound, images and video streams. For a discussion of such algorithms, reference should be had to A. Del Bimbo, editor. *The Ninth International Conference on Image Analysis and Processing*, volume 1311. Springer, September 1997. For example, medical images typically use edge detection algorithms to extract the data objects, while domain-specific knowledge is used to classify the data objects as medically significant objects, such as blood vessels, lesions and tumors. Fourier and wavelet transformations as well as many filtering algorithms are also used for feature extraction. For example, wavelet analysis has been used to characterize the texture of a region and to determine a shape (such as a letter) without regard to the location or the orientation of the shape within the image.

The data structures that represent features typically conform to a data model for the database that determines the kinds of components and attribute values that are allowed. Each feature can have one or more values associated with components of the data structure that represents the feature. In the simplest case, the data structure can have a single component with an associated value, and the feature can be represented by one attribute of the object. More complex features can be represented by several inter-related components, each of which may have attribute values. The data model for features at the domain level is often called an ontology. An ontology models knowledge within a particular domain, such as, for example, medicine. An ontology can include a concept network, specialized vocabulary, syntactic forms and inference rules. In particular, an ontology specifies the features that objects can possess as well as how to extract features from objects. Each feature of an object may have an associated weight, representing the "strength" of the feature or the degree with which the object has the feature.

Current systems for performing feature extraction from information objects use very simple ontologies. Furthermore, the ontologies are implicit in the design of the system rather than being a separate component of the system. As a result, current systems cannot be used for more than the single ontology for which they were designed. Using a different ontology or even adding new capabilities to the ontology are generally not possible without completely redesigning the system. Such systems are not suited for the large, complex, evolving ontologies that are typical of modern application domains.

When the information object is not a document written in a natural language, the information retrieval system cannot employ the cosine measure described above to measure relevance of the information, and so other measures (discussed below) have been developed for use in extracting features from images and other multimedia in those systems. This distinction further illustrates the differences between word-based and non-word based information retrieval systems, as recognized by those skilled in the art.

To assist in finding information in a database representing image features and the like, special search structures are employed called indexes. Current indexing techniques are very limited when it comes to addressing the problem of similarity indexing. Many search engines are limited to indexing the metadata attached to the information objects and do not index the content of the information objects. Other search engines that can directly index the content of information objects use indexing techniques that degrade significantly with increase in dimension or scale, and they generally just select some of the information objects rather than rank order them.

Current technology generally requires a separate index for each attribute or feature. Even the most sophisticated indexes in this technology are limited to a very small number of attributes. Since each index can be as large as the database itself, this technology does not function well when there are hundreds or thousands of attributes, as is often the case when objects such as images, sound and video streams are directly indexed. Furthermore, there is considerable overhead associated with maintaining each index structure. This limits the number of attributes that can be indexed. Current systems are unable to scale up to support databases for which there are many object types, including images, sound and video streams; millions of features; queries that involve simultaneously many object types and features; and new object types and features being continually added.

Another characteristic of current technology is that it treats each information object as an indivisible unit for the purposes of retrieval, i.e., an information object is retrieved as a whole or not at all. For example, World Wide Web browsers retrieve each document as a unit and present it only when the entire document has been downloaded and formatted. Individual data entries and even sections within an object are not individually indexed. Some search engines are even more extreme in this respect; i.e., they only categorize entire Web sites.

Current search engines commonly include index entries that are stale, i.e., the documents that produced the index entries have been updated or deleted since the time when the documents were indexed. This behavior is necessary because it is prohibitively expensive to monitor so many documents continuously. For many documents, this behavior is acceptable, but for certain time-sensitive documents, such as those containing commodity prices, it is important for the index to be current.

Further information can be had regarding the foregoing concepts with reference to the following publications:

1. L. Aiello, J. Doyle, and S. Shapiro, editors. *Proc. Fifth Intern. Conf. on Principles of Knowledge Representation and Reasoning*. Morgan Kaufman Publishers, San Mateo, Calif., 1996.
2. K. Baclawski. Distributed computer database system and method, December 1997. U.S. Pat. No. 5,694,593. Assigned to Northeastern University, Boston, Mass.
3. N. Fridman Noy. *Knowledge Representation for Intelligent Information Retrieval in Experimental Sciences*. PhD thesis, College of Computer Science, Northeastern University, Boston, Mass., 1997.
4. P. Hayes and J. Carbonell. Scout—automated query-relevant document summarization. Technical Report 1997 Project Summary, Carnegie Group, Pittsburgh, Pa., 1997.

5. Y. Ohta. *Knowledge-Based Interpretation of Outdoor Natural Color Scenes.* Pitman, Boston, Mass., 1985.
6. M. Zloof. Query-by-example: the invocation and definition of tables and forms. *In Proc. Conf. on Very Large Databases,* pages 1–24, 1975.

The disclosures of the publications referenced in this "Background of the Invention" are incorporated herein by reference.

It would be desirable to provide an information retrieval system that can retrieve information from a unified database of word and non-word based information, including documents, images and other forms of multimedia, using a single indexing system, and otherwise overcome many of the performance and other problems and limitations of current systems. Such information retrieval systems preferably would be highly scalable, versatile, robust and economical.

SUMMARY OF THE INVENTION

The invention resides in processing a query in an information retrieval apparatus for word based and non-word based retrieval of information from a database by extracting a number of features from the query, fragmenting each of the features into feature fragments, and hashing each of the feature fragments into hashed feature fragments. The hashed feature fragments can be used in accessing a hash table for obtaining object identifiers therefrom that can be used for obtaining information from the database relevant to the query. In another aspect, the invention resides in an information indexing system for indexing information for facilitated retrieval from a database, by extracting a number of features from the information, fragmenting each of the features into feature fragments, and hashing each of the feature fragments into hashed feature fragments. The hashed feature fragments are used in accessing a hash table for storing object identifiers specifying the locations determined by the hashed feature fragments at which information should be stored. The information retrieval apparatus can be implemented in a distributed computer database system.

In general, the term "feature" as used herein means any information or knowledge associated with an information object or derived from the content of the information object, regardless of whether the information object represents a document, image or other multimedia, which has meaning within the applicable domain and conforms to the applicable ontology. Thus, for example, where the information object represents a photographic image of a human face, e.g., for entry in a photography contest, the features of the image include the eyes, nose and mouth because they can be perceived when the image is viewed by the judges. When the same image is used for skin disease diagnosis, the domain and ontology shift, and the features can include even blemishes that are not noticeable with the unaided eye.

More specifically, the distributed computer database system in accordance with an aspect of the invention can include one or more front end computers and one or more computer nodes interconnected by a network into a search engine for retrieval of database objects including, e.g., images, sound and video streams, as well as plain and structured text. A query or query object, preferably in the same format as the database objects to be retrieved, is transmitted from a user to one of the front end computers, which forwards the query to one of the computer nodes, termed the home node, of the search engine. The home node extracts features from the query, generates fragments from the features, and hashes these feature fragments. Each hashed feature fragment is transmitted to a node on the network. Each node on the network that receives a hashed feature fragment uses the hashed feature fragment to perform a search on its respective partition of the database. Results of the searches of the local databases are gathered by the home node. If requested by the user, this process is repeated a second time by the home node to refine the results of the query.

The foregoing distributed computer database system can be implemented with a number of useful capabilities. For example, the system can be implemented to support indexing and retrieval of information objects such as images, sound and video streams, as well as objects such as text files and structured documents. Both the content of the information objects themselves as well as any metadata attached to the objects can be indexed. The retrieval of objects relevant to a query is based preferably on an ontology, which is regarded as a separate component of the system and can be large, complex and evolving. The information objects themselves need not be stored in the database system itself so long as their locations are available in the database system, for example, as long as the database stores pointers to the information objects stored at remote locations. For example, the database can store URLs of documents stored at remote servers connected to the Internet or an intranet. Moreover, responsive to an indication that an information object is time-sensitive, the system can download the object for processing only when (and not until) it is relevant to a query, thus eliminating stale data in the database.

The distributed computer database system of the invention can also have the capability of supporting the indexing of all three kinds of features: metadata, features computed when the object is indexed and features computed during query processing. The features may be complex data structures, and any suitable computer-implemented similarity measure, such as the Feature Contrast Model, may be used to compare a query with an information object. One or more than one similarity measure may be used within the same query or information object. The objects in the database can associate similarity functions with the feature types with which they are to be employed, or even specify those similarity functions.

The distributed computer database system can use a high-performance distributed indexing methodology that scales to support the indexing of very large numbers of object types, including images, sound and video streams, millions of features, queries that involve many object types and features simultaneously, and new object types and features being continually added to the system. This avoids the limitations of current systems. The indexing methodology e.g., permits indexing and retrieval of individual data entries within a single information object rather than only entire documents as in many current systems.

For presentation to a user, the distributed computer database system collects database entries from a number of relevant sources and, e.g., organizes them into a single table for presentation to the user. Furthermore, the user may specify that the requested information is time-sensitive, in which case the present invention will download the current state of the information object and process it to extract the relevant information. This avoids the limitation of current search engines that contain large numbers of stale index entries.

In another aspect of the invention, a distributed computer database system that includes one or more front end computers and one or more computer nodes interconnected by a network operates as a search engine. A user wishing to query the database, transmits the query to one of the front end computers which in turn forwards the query to one of the computer nodes of the network. The node receiving the query, termed the home node of the search engine, extracts the features of the received query using the feature extraction algorithms specified in the ontology. The features are fragmented into data structures having a bounded size. The fragments are then hashed using one of the many hashing algorithms that are available. A portion of each hashed fragment is used by the home node as an addressing index by which the home node transmits the hashed query feature to a node on the network. Each node on the network that receives a hashed query fragment uses the hashed query fragment to perform a search on its respective database. Nodes finding data corresponding to the hashed query fragment return, e.g., the OIDs of the objects possessing this fragment. A computer-implemented matching function, e.g., specific to the type of the fragment, may be invoked to select, e.g., a subset of the OIDs to be returned. The home node gathers the extracted information objects and a computer-implemented similarity function or algorithm is computed based on the fragments that are in common with the query as well as the fragments that are in the query but not in the returned object. The similarity function is used to rank the objects, e.g., based on a computed strength of the match, i.e., degree of similarity or relevance. The function used for each fragment can be, e.g., specific to the type of the fragment. The results are, e.g., either a list of object identifiers in rank order or a table of data associated with or extracted from the objects. The home node can also reduce redundancy when the same information is contained in more than one document. In particular, the extracted information can be arranged, e.g., according to the Maximum Marginal Relevance (MMR) metric of Hayes and Carbonell, referenced above. The results, whether a list or a table, are transmitted to the front end node which formats the response to the user. For example, if the front end node is a World Wide Web server, then the front end node constructs a page in HTML format containing a list of URLs or a table each of whose entries have the extracted parts of a relevant document as well as a reference to the URL of the document. The front end computer transmits the formatted response to the user.

The foregoing distributed computer database system can process information objects to be indexed in the same manner as queries, except that the query nodes simply store data in their respective databases and no information is returned to the home node.

In yet another aspect of the invention, the distributed computer database system can also provide, responsive to a user request, higher levels of service, e.g., Level 1 service, as described above, as well as Level 2 and 3 service. For level 2 or level 3 service, the OIDs obtained in the basic service above are transmitted to additional nodes on the network by using a portion of each OID as an addressing index. In addition, if level 3 service is requested, the features each object has in common with the query are transmitted along with the OIDs to the same nodes on the network. Each node on the network that receives an OID uses the OID to perform a search on its respective database for the corresponding object information. In level 2 service, auxiliary information is retrieved and transmitted to the front end node. The auxiliary information can include, e.g., the URL of the object or an object summary or both. For level 3 service, a dissimilarity value is computed based on the fragments that the object possesses but the query does not. The dissimilarity value as well as the auxiliary information about the object is transmitted to the home node. The dissimilarity value can use functions specific to the types of the fragments. The dissimilarity values are gathered by the home node, which uses them to modify the similarity values of the objects obtained in the first level of processing. The modified similarity values are used to rank the objects. The OIDs and any auxiliary information about the objects that have the largest similarity value are transmitted to the front end node. Level 3 service has the additional capability of downloading and processing the original information object if this is specified. There are a number of ways that it can be specified, for example:

1. The ontology can specify that a type of fragment is time-sensitive.
2. The information object itself can specify that it is time-sensitive.
3. The query can specify that some or all of its fragments are time-sensitive.

In each case above, to avoid stale data, the information object is downloaded if it is requested and the most recent download is older than a specified length of time. The length of time can be specified by the user, can be a system parameter, or can be computed dynamically, e.g., based on the type of information object. Regardless of the level of service requested, the front end node formats the response to the user, e.g., based on the OIDs and any auxiliary information transmitted by the home node. For example, if the front end node is a World Wide Web server, then the front end node can construct a page in HTML format containing a reference to a URL and auxiliary information for each object. The front end node transmits the formatted response to the user.

Accordingly, the invention can provide an information retrieval system that can retrieve information from a unified database of word and non-word based information, including documents, images and other forms of multimedia, using a single indexing system, and otherwise overcome many of the performance and other problems and limitations of current systems. The invention can also provide an information indexing system coordinated with the retrieval system for facilitated retrieval of the information. Such information indexing and retrieval systems can be based on a distributed model and, consequently, highly scalable, versatile, robust and economical.

BRIEF DESCRIPTION OF THE DRAWINGS

The above and further advantages of the invention may be better understood by referring to the following description in conjunction with the accompanying drawings in which:

FIG. 4a–FIG. 4f are block diagrams showing formats for a query message, query response message, object message, object response message, insert message, and insert object message, respectively, as may be used in conjunction with the embodiment of FIGS. 2 and 3;

DETAILED DESCRIPTION OF A PREFERRED EMBODIMENT

Figure 1:
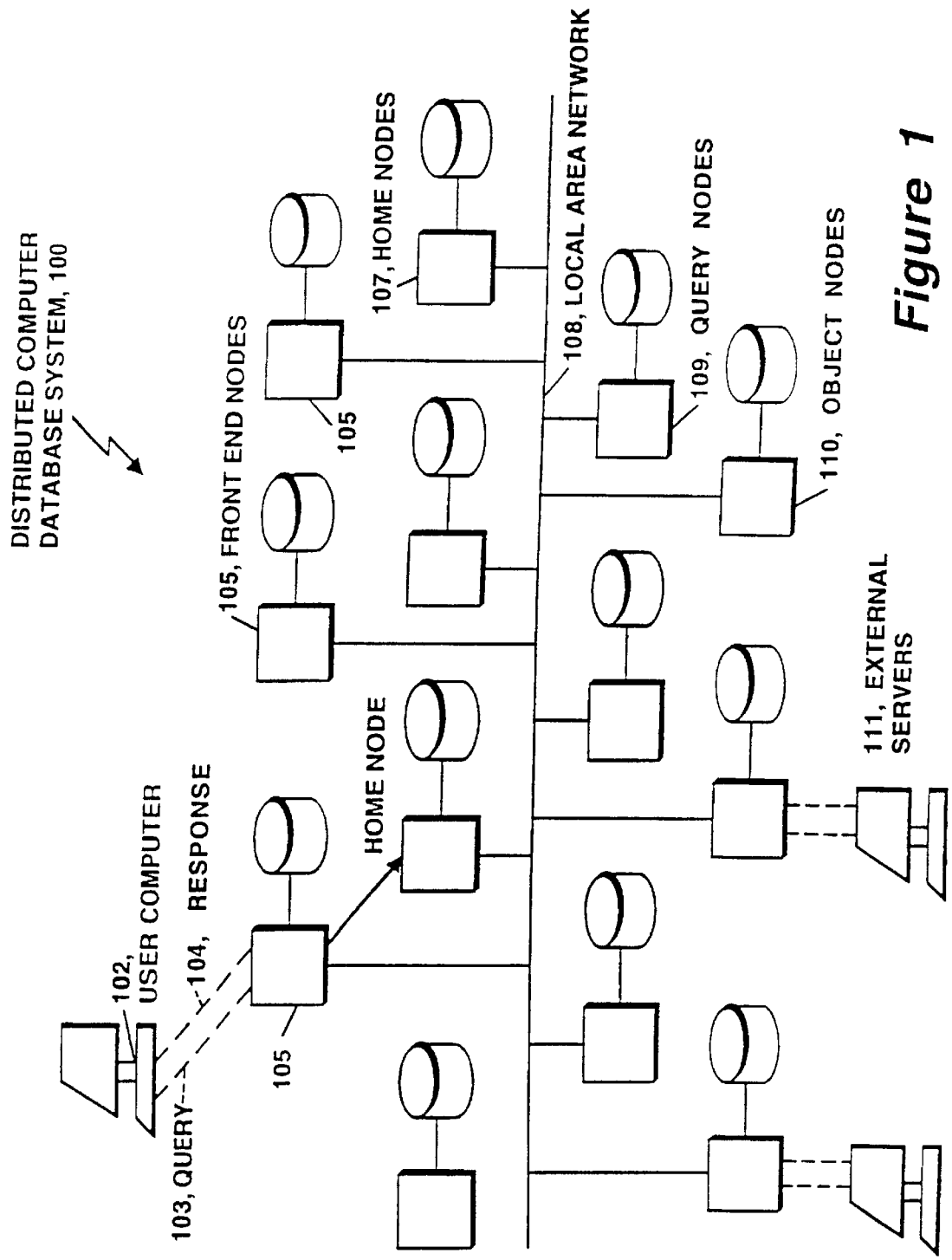
FIG. 1 is a block diagram of an embodiment of the distributed computer database system in accordance with the invention.

Referring to FIG. 1, in broad overview, one embodiment of a distributed computer database system 100 in accordance with the invention includes a user computer 102 in communication, e.g., over a communication link 103, 104, e.g., a network, with one of a number of front end computers 105. The front end computer 105 (which may also be the user computer in other embodiments of the invention) is in turn in communication with a search engine which includes one or more computer nodes 106, 109, 110 interconnected by a local area network 108. The individual computer nodes 106, 109, 110 may include local disks for providing data for the search engine, or may, alternatively or additionally, obtain data through a network from a disk server or other external servers 111.

Each of the computer nodes 106, 109, 110 of the search engine may be of any of several types, including home nodes 106, query nodes 109 and object nodes 110. The nodes 106, 109, 110 of the search engine need not represent distinct computers. In one exemplary implementation, the search engine consists of a single computer, which takes on the roles of all home nodes 106, query nodes 109 and object nodes 110. In another exemplary implementation, the search engine consists of separate computers for each home node 106, query node 109 and object node 1 10. Those skilled in the art will realize many variations are possible which will still be within the scope and spirit of the preferred embodiment.

During operation, the user computer 102 transmits a query over link 103 to one of the front end computers 105. The front end computer 105 provides the user interface for the search engine, invokes a data search by the search engine to process the query and to generate a response, and then, at least in one embodiment, returns the response to the user computer 102.

Figure 2:
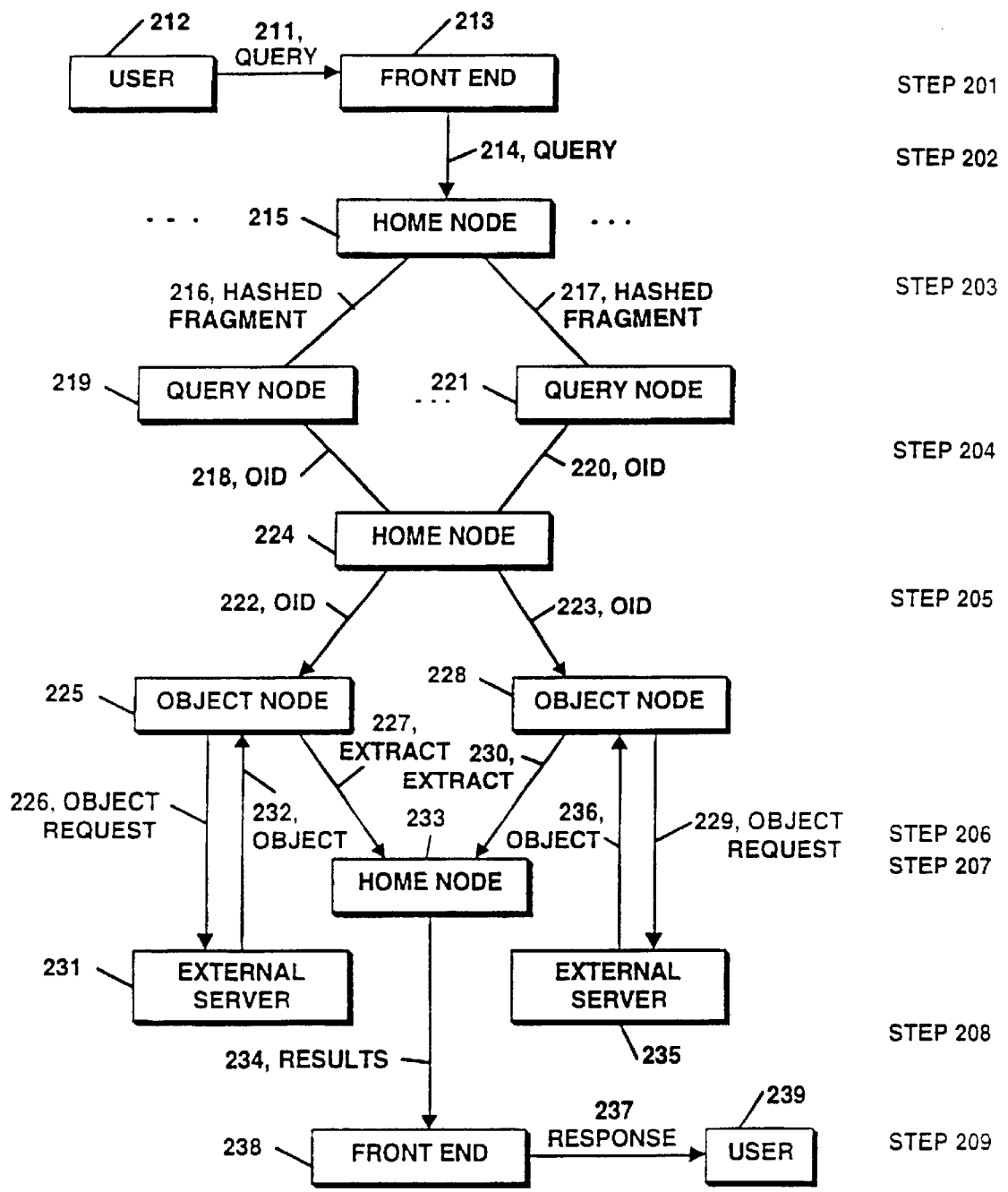
FIG. 2 is a block diagram of the distributed computer database system of FIG. 1 in flow chart form, which illustrates a method of processing queries at different levels of service and returning results in accordance with an embodiment of the invention including downloading of time sensitive object information from external servers.

Considering the processing of a query first, and referring also to FIG. 2, in one embodiment when a user transmits (Step 201) a query over connection or link 211 from the user computer 212, the front end computer 213 receives the query. The front end computer 213 is responsible for establishing the connection 211 with the user computer 212 to enable the user to transmit a query and to receive a response in an appropriate format. The front end computer 213 is also responsible for any authentication and administrative functionality. For example, the front end computer 213 can be a World Wide Web server communicating with the user computer 212 using the HTTP protocol.

After verifying that the query is acceptable, the front end computer 213 performs any reformatting necessary to make the query compatible with the requirements of the search engine. Queries to retrieve objects in the database are preferably in the same format as the objects in the database. Each query may include one or more markers or variables denoting data items to be retrieved. This technique can be used for fuzzy queries on object databases. The term "fuzzy query" denotes a query specifying information to be retrieved in terms of a set of conditions that might only be satisfied to an extent or degree specified in the query. For example, a fuzzy query seeking information about tall persons might specify height over seven feet (213 cm) as being tall (100%), while someone under five feet (152 cm) as not tall (0%), and someone between five and seven feet as having a degree of tallness between 0% and 100%. Preferably, the features of the queries are extracted using the same ontology as the one used to extract features from the information objects.

The front end computer 213 then transmits the query to one of the home nodes 215 of the search engine (Step 202), which is then defined as the home node of the search engine for that query.

The home node 215 extracts features from the query according to the ontology. Features are extracted from structured queries or documents by parsing the query or document to produce a data structure, then dividing this data structure into (possibly overlapping) substructures called fragments. Fragments of a query are used to find matching fragments in the database, so they are also called probes.

Features are extracted from unstructured documents by using feature extraction algorithms, e.g., implemented as computer programs executable by the home node 215. Feature extraction produces a data structure consisting of a collection of inter-related domain objects. The data structure is divided into (possibly overlapping) substructures, as in the case of a structured document, and these substructures are the fragments of the unstructured document. A large variety of feature extraction algorithms have been developed for media such as sound, images and video streams, for example, edge detection, segmentation and object classification algorithms for images. Fourier and Wavelet transformations as well as many filtering algorithms are also used to extract features from images and sound. Video streams comprise a sequence of images and a synchronized sound track. In addition to feature extraction from the individual images and sound track, video streams can be organized into scenes; domain objects in successive images can be identified with one another and domain objects of the sound track can be related to domain objects in the corresponding scenes. Features extracted from video streams can also include these domain objects. Each feature can have one or more values associated with components of the data structure that represents the feature. In the simplest case the data structure consists of a single component with an associated value. In this case, the feature represents one attribute of the object. More complex features will contain several interrelated components, each of which may have attribute values. The data structures that represent the features conform to a data model specified by the ontology. The data model determines the kinds of components and attribute values that are allowed. Each fragment of each feature has an associated weight, representing the strength of the feature.

If a fragment occurs very commonly in the database, then it can not contribute to the purpose of the search engine; namely, distinguishing those objects that are similar to a particular query. An example is the brightness of an image. The possible values of such a fragment will be partitioned into a collection of contiguous, non-overlapping ranges of the values. Each range of the value is then regarded as a separate fragment. When the fragments of a query are extracted, fragments that represent value ranges near, but not including, the value of the fragment in the query can also be included as fragments of the query, but with smaller weights than the fragment representing a value range that includes the value of the fragment in the query. The value ranges for a particular fragment can either be specified explicitly in the ontology, or they can be constructed dynamically as objects are indexed by the search engine.

When a marker appears in a query fragment, the marker represents a data item to be retrieved. The marker is replaced by any term in a document such that the modified fragment is a valid fragment according to the ontology. For example, a fragment that requests the color of a house would retrieve all colors of houses occurring in the object database, and thus the marker is replaced, e.g., by white, brown or other retrieved color.

The home node encodes each fragment of the query by using a predefined hashing function. The same hashing function preferably is also used in generating indexes to storage locations for storing data locally in local databases on the various query nodes. The use of the same hashing function to generate an index for data storage and to generate hashed probes for a query assures that data is distributed uniformly over the query nodes of the search engine during the storing of data, and that the probes are scattered uniformly over the query nodes during the processing of a query.

The hash value resulting from the use of the hashing function has a first portion, which serves to identify the query node to which data is to be sent for storage or to which a query fragment is to be sent as a probe. The hash value also has a second portion, called the local index value, which is used to specify the storage locations in the query node at which data is to be stored or from which data is to be retrieved. Thus, in terms of a query, the hashed query fragments are distributed (Step 203) over connections or links 216, 217 as probes to certain query nodes 216, 221 of the search engine, as identified by the first portion of the hash value.

At a first or basic service level, query nodes 219, 221 whose probes match the index fragments by which the data was initially stored on that query node respond to the query by, e.g., transmitting (Step 204) the OIDs matching the index terms of the requested information to the home node 224 over connections or links 218, 220. Thus all matches between the hashed probes and the local hash table of index terms are returned or gathered to the home node 224 that initially hashed the query fragments.

The home node 224 then determines the relevance of each object returned in the search. This determination of relevance is made by the home node 224 by comparing the degree of similarity between the query and the objects whose OIDs were returned. The measure of similarity between the query and the object can be, for example, a cosine measure given by the expression COS(v,w), where the vector v denotes the query and the vector w denotes the object. These vectors are in a space in which each fragment represents one dimension of the space.

When the information object is not a document written in a natural language, the information retrieval system cannot employ the cosine measure described above to measure relevance of the information. Another commonly used measure of similarity between two objects suitable for other types of information is a distance function in the same space mentioned above for the cosine measure; however, there is convincing evidence that human perception of similarity does not satisfy the axioms of a distance function. For a discussion of this, reference should be had to R. Jain, "Content-Centric Computing in Visual Systems," in *The Ninth International Conference on Image Analysis and Processing, Volume II*, pages 1–13, September 1997, the disclosure of which is incorporated by reference. Accordingly, a preferred model that seems to be the most successful current approach is the Feature Contrast Model," as described in "Features of Similarity," *Psychological Review*, 84(4):327–352, July 1977. In this model, the similarity between a query and an object is determined by three terms:

1. The features that are common to the query and the object.
2. The features of the query that are not features of the object.
3. The features of the object that are not features of the query.

The first term contributes a positive number to the similarity value, while the second and third terms have negative contributions. In addition the second and third terms are multiplied by predefined constants such that a feature in the second and third set has less effect on the similarity than one in the first set.

In an implementation using this model, the measure of similarity between the query and the object is determined by three predefined constants that are used to multiply the three terms occurring in the Feature Contrast Model. In this embodiment, if the level of service is specified to be either level 1 (basic) or level 2, then only the first two terms of the Feature Contrast Model are used to compute the measure of similarity, or equivalently, the predefined constant for the third term is set to zero. Since the third term is the least important, it has only a small effect on the ranking of the objects that are retrieved. If all three terms are to be used, then level 3 service can be requested. Then, based on the measure of similarity, the implementation can return a predetermined number, N, of objects with the highest similarity, or, alternatively, all objects that generate similarity values greater than a predetermined value, which are considered sufficiently similar to the query to be returned to the user as relevant information.

Once the similarity is determined, the home node 224 orders the OIDs according to their degree of similarity and then returns a list of the most relevant OIDs. Here, too, different embodiments can take different, alternative approaches. For example, the list of the most relevant OIDs can be transmitted (Step 205) to the front end computer 213, which formats the response appropriately and transmits the response to the user. Alternatively, a list of the most relevant OIDs can be transmitted directly to the user computer through the network 108 without the intervention of the front end computer.

In yet another alternative, for higher levels of service (level 2 and level 3), the home node 224 transmits (Step 206) the most relevant OIDs to the object nodes 225, 228, which hold information associated with the objects identified by the OIDs. The information associated with each object is, e.g., the URL for the object, the object itself, or a list of the features of the object and the values of the features for those features that have associated values. To facilitate access to the information, the OIDs can have a first portion that serves to identify the object node 225, 228 on which the object information is stored. The OIDs can also have a second portion that is a local index value used to identify the locations in a local table in the object node 225, 228 at which the object information is stored.

For level 2 service, the object nodes 225, 228 return the object information of the most relevant objects. According to a time sensitivity specification, an object node 225, 228 may download the object from an external server 231, 235 to update the object information maintained on the object node. Downloading is accomplished by establishing communication with the external server 231, 235 responsible for the object, requesting the object update over connection or link 226, retrieving the object over connection or link 232, 236, and extracting the features of the object (Step 206). The time sensitivity specification may be specified in the query, in each fragment of the query and/or in the object. Then, the object information of the most relevant objects can be transmitted (Step 207) to the front end computer 213, which formats the response appropriately and transmits the response to the user computer 212, or directly to the user computer 212 through the network 108 without the intervention of the front end computer.

For level 3 service, the object nodes 225, 228 transmit (Step 207) the object information of the relevant objects to the home node 233. The home node 233 uses the object information of the relevant objects to re-compute the measure of similarity between the query and the objects. This may result in the objects being arranged in a different order and may also result in a different list of objects being returned. For this task, the home node 233 can utilize the Feature Contrast Model and all three terms can have nonzero predefined constants. In this embodiment, the object information contains a list of the features of the object so that features of the object that are not features of the query may be included in the measure of similarity. Then, the home node 233 returns the object information of the most relevant objects, which is transmitted to the front end computer 238 (Step 208), which formats the response appropriately and transmits the response to the user computer 239 (Step 209). In another embodiment, the home node 233 uses the extracted information of the relevant objects to construct one or more tables of information. In another embodiment, the object information of the relevant objects or the constructed tables are transmitted directly to the user computer 239 through the network 108 without the intervention of the front end computer 238.

In the foregoing discussion of FIG. 2, it should be noted that different reference numbers referred to the same node for convenience in description of the system and its operation. Accordingly, for example, while the home node was designated as 215, 224, and 233, it can be the same node and not different components. Similarly, front end computer 213, 238 can be the same node, as can user computer 212, 239.

Figure 3:
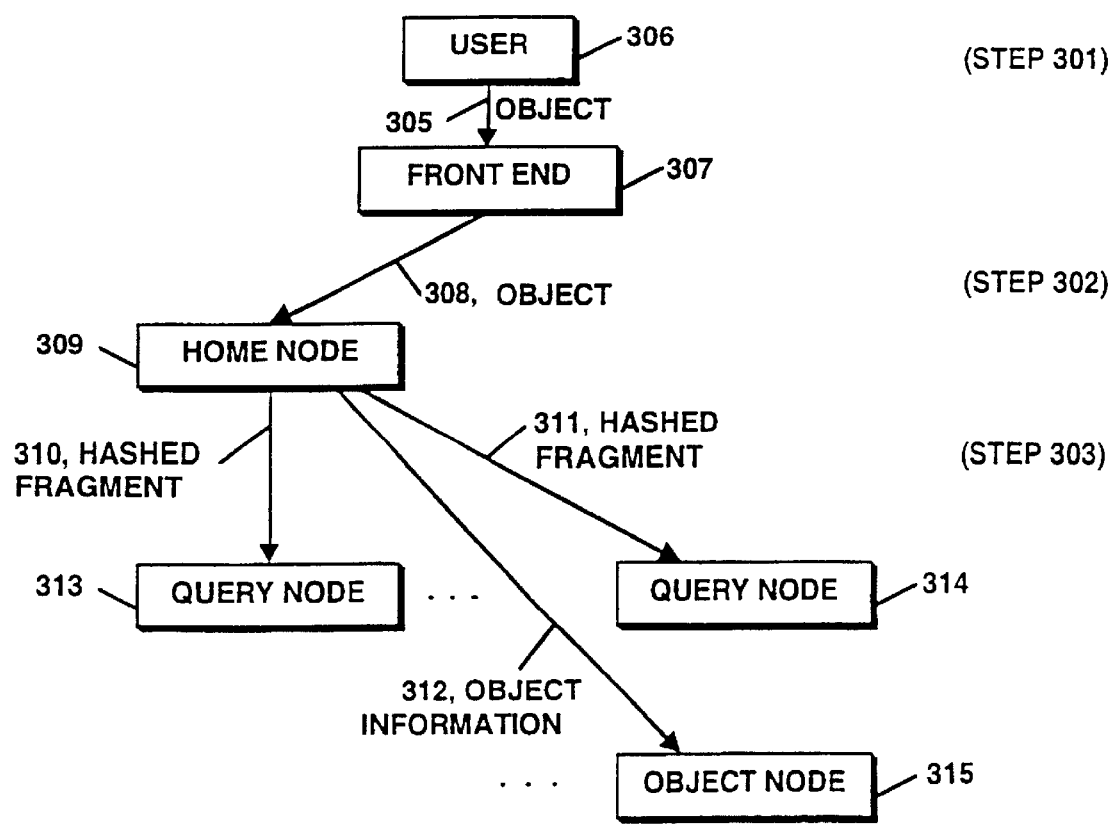
FIG. 3 is a block diagram of the distributed computer database system of FIG. 1 in flow chart form, which illustrates a method for indexing information objects in accordance with an embodiment of the invention.

Considering next the indexing of an object, and referring also to FIG. 3, in one embodiment when a user transmits (Step 301) an object from the user computer 306, the front end computer 307 receives the object. The front end computer 307 is responsible for establishing the connection with the user computer 306 to enable the user to transmit an object. In another embodiment, the front end computer 303 automatically examines objects in its environment for indexing by the search engine without interaction with a user. The front end computer 307 selects a home node 309 and transmits the object over connection or link 308 to the selected home node (Step 302). In one embodiment, the selection of a home node is done randomly so as to evenly distribute the workload among the home nodes. The home node 309 assigns a unique OID to the object, then processes the object as discussed above in the case of a query (Step 303), except that data (i.e., the hashed fragment) as sent over connections or links 310, 311, 312 and associated with the object is stored in the query nodes 313 and an object node 314, 314.

Considering next the message formats used in the preferred embodiment, and referring also to FIG. 4a, a Query Message is produced by the hashing module 512 (FIG. 5) and transmitted from a home node to a query node. The Query Message has four fields: Header 402, Query Identifier (QID) 403, Hashed Query Fragment (HQF) 404, and Value 405. The Header field 402 specifies that this message is a Query Message and also specifies the destination query node. The destination query node is determined by the first portion of the hashed query fragment. The QID field 403 contains a query type specifier and a query identifier. The HQF field 404 contains a fragment type specifier and the second portion of the hashed query fragment produced by the Hashing Module 512. The Value field 405 contains an optional value associated with the fragment. The fragment type specifier determines whether the Query Message contains a Value field, and if the Query Message does contain a Value field then the fragment type specifier determines the size of the Value field.

FIG. 4b shows an exemplary format for an Query Response Message. The Query Response Message is produced by the Similarity Comparator 514 (FIG. 5) and transmitted from a query node to a home node. Each Query Response Message is the result of a Query Message. The Query Response Message contains four fields: Header 406, QID 407, Object Identifier (OID) 408, and Weight 409. The Header field 406 specifies that this message is a Query Response Message and also specifies the destination home node. The destination home node is the home node from which the corresponding Query Message was received. The QID field 407contains a query type specifier and a query identifier. The OID field 408 contains an object type specifier and an object identifier. The Weight field 409 contains an optional weight associated with the object. The object type specifier determines whether the Query Response Message contains a Weight field 409, and if the Query Response Message does contain a Weight field then the object type specifier determines the size of the field.

FIG. 4c shows an exemplary format for an Object Message. The Object Message is produced by the Similarity Comparator and transmitted from a home node to an object node. The Object Message has four fields: Header 410, QID 411, OID 412, and Time Sensitivity (TS) TS. The Header field 410 specifies that this message is an Object Message and also specifies the destination object node. The destination object node is determined by the first portion of the object identifier. The QID field 411 contains a query type specifier and a query identifier. The OID field 412 contains an object type specifier and the second portion of the object identifier. The TS field 413 contains an optional time sensitivity specifier. The object type specifier determines whether the Object Message contains a TS field, and if the Object Message does contain a TS field then the object type specifier determines the size of the TS field.

FIG. 4d shows an exemplary format for the Object Response Message. The Object Response Message is produced by the object table or by the feature extractor and transmitted from an object node to a home node. The Object Response Message has three parts: Identifier, Feature and Auxiliary. The Identifier part has four fields: Header 414, QID 415, OID 416, and Location 417. The Header field 414 specifies that this message is an Object Response Message and also specifies the destination home node. The destination home node is the home node from which the corresponding Object Message was received. The QID field 415 contains a query type specifier and a query identifier. The OID field 416 contains an object type specifier and the object identifier. The Location field 417 contains an optional location specifier such as a URL. The object type specifier determines whether the Object Response Message contains a Location field, and if the Object Response Message does contain a Location field, then the object type specifier determines the size of the Location field. The Feature part contains a field 418 specifying a number of features associated with the object. The Auxiliary part contains a field 419 specifying auxiliary information associated with the object. The object type specifier determines whether the Object Response Message contains an Auxiliary part, and if the Object Response Message does contain an Auxiliary part, then the object type specifier determines the size and structure of the Auxiliary part.

FIG. 4e shows an exemplary format for the Insert Message. The Insert Message is produced by the hashing module and transmitted from a home node to a query node. The Insert Message has four fields: Header 420, OID 421, HQF 422, and Value 423. The Header field 420 specifies that this message is an Insert Message and also specifies the destination query node. The destination query node is determined by the first portion of the hashed query fragment. The OID field 421 contains an object type specifier and the object identifier. The HQF field 422 contains a fragment type specifier and the second portion of the hashed query fragment produced by the Hashing Module. The Value field 423 contains an optional value associated with the fragment. The fragment type specifier determines whether the Query Message contains a Value field, and if the Query Message does contain a Value field then the fragment type specifier determines the size of the Value field.

FIG. 4f shows an exemplary format for the Insert Object Message. The Insert Object Message is produced by the feature extractor and transmitted from a home node to an object node. The Insert Object Message has three parts: Identifier, Feature and Auxiliary. The Identifier part has four fields: Header 424, OID 425, TS 426, and Location 427. The Header field 424 specifies that this message is an Insert Object Message and also specifies the destination object node. The destination object node is determined by the first portion of the object identifier. The OID field 425 contains an object type specifier and the second portion of the object identifier. The TS field 426 contains an optional time sensitivity specifier. The object type specifier determines whether the Object Message contains a TS field, and if the Object Message does contain a TS field then the object type specifier determines the size of the TS field. The Location field 427 contains an optional location specifier such as a URL. The object type specifier determines whether the Insert Object Message contains a Location field, and if the Insert Object Message does contain a Location field, then the object type specifier determines the size of the Location field. The Feature part contains a field 428 for specifying a number of features associated with the object. The Auxiliary part contains a field 429 for specifying auxiliary information associated with the object. The object type specifier determines whether the Insert Object Message contains an Auxiliary part, and if the Insert Object Message does contain an Auxiliary part, then the object type specifier determines the size and structure of the Auxiliary part.

Figure 5:
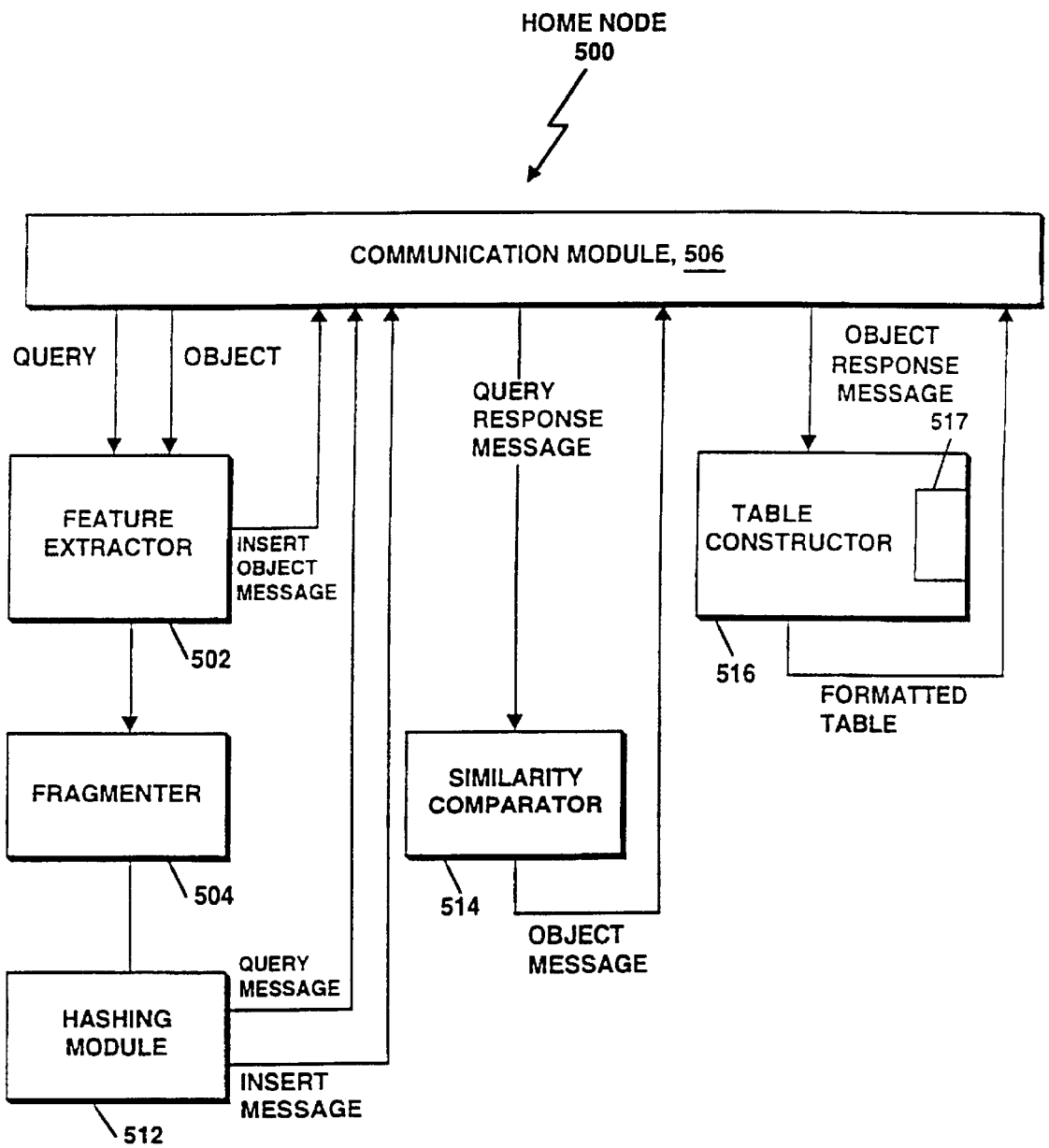
FIG. 5 is a block diagram of a representative one of the home nodes of FIGS. 1, 2 and 3 in accordance with an embodiment of the invention.

Each node of the distributed computer database system includes a Communication Module, discussed below and shown in FIGS. 5, 6 and 7, responsible for transmitting and receiving messages from one node to another. Transmission of a message requires (1) enqueuing of the message prior to transmission over the communication medium, (2) actual transmission over the communication medium, and (3) enqueuing a task to process the message when the message is received by the module determined by the message type. The message type determines the command that is issued to the receiving module. The command determines the means by which the message is to be processed by the module.

The destination node for a message to be transmitted is specified in the Header field of each message. When a message is received from another node, the type of message determines which module in the node will process the message. The message type is also specified in the Header field of each message. The Communication Module of a home node is also responsible for communication with the Front End nodes. A Front End node transmits queries and objects to the home node, and the home node transmits results, such as formatted tables, to the Front End node.

Considering next exemplary embodiments of the nodes discussed above, and also referring to FIG. 5, a home node 500 can have a feature extractor 502 that extracts features from a query or object. Feature extraction for images is performed by detecting edges, identifying the image objects, classifying the image objects as domain objects and determining relationships between domain objects. In another embodiment, feature extraction for images is performed by computing Fourier or wavelet transforms. Each Fourier or wavelet transform constitutes one extracted feature. The extracted features are transferred to a Fragmenter 504. In addition, when features have been extracted from an object, the features are transferred to a Communication Module 506 in the form of an Insert Object Message.

The Fragmenter 504 computes the fragments contained in each feature. Each fragment consists of a bounded set of related components in the feature. In one embodiment, each attribute and each relationship in the data structure defining the feature constitutes a different fragment. The fragments are transferred to the Hashing Module 512.

The Hashing Module 512 computes a hash function of a fragment. In one embodiment, the hash function is the MD4 Message Digest algorithm, as set forth in a specification, Request for Comment (RFC) 1186, published by the Network Working Group of the Internet Engineering Task Force, October, 1990, and available over the Internet or from R. Rivest at the MIT Laboratory for Computer Science, Cambridge, Mass., USA. The Hashing Module 512 transfers either a Query Message or an Insert Message to the Communication Module 506, depending on whether the fragment is a query fragment or an object fragment, respectively.

The Similarity Comparator 514 receives Query Response Messages and produces Object Messages, which are transferred to the Communication Module. The Similarity Comparator 514 gathers all the query responses for a query. For each object in the responses, the Similarity Comparator 514 determines the relevance of each object returned in the search. This determination of relevance is made by the home node by comparing the degree of similarity between the query and the objects whose OIDs were returned. In one embodiment, the measure of similarity between the query and the object is a cosine measure and is given by the expression $COS(v,w)$, where the vector v denotes the query and the vector w denotes the object. These vectors are in a space in which each fragment represents one dimension of the space. The most relevant OIDs are transferred to the Communication Module 506 using an Object Message.

The Table Constructor 516 receives Object Response Messages, and formats a table 517 stored in memory by collecting all the Object Response Messages having the same QID field. In one embodiment, each Object Response Message results in one row of the formatted table 517. The entries in the row are determined by each feature of the Features part of the Object Response Message. In addition, one entry in the row specifies the Location field. The arrangement of the rows within the table 517 is determined by the Auxiliary parts of the Object Request Message. The formatted response is transmitted to the front end computer from which the query was received.

Figure 6:
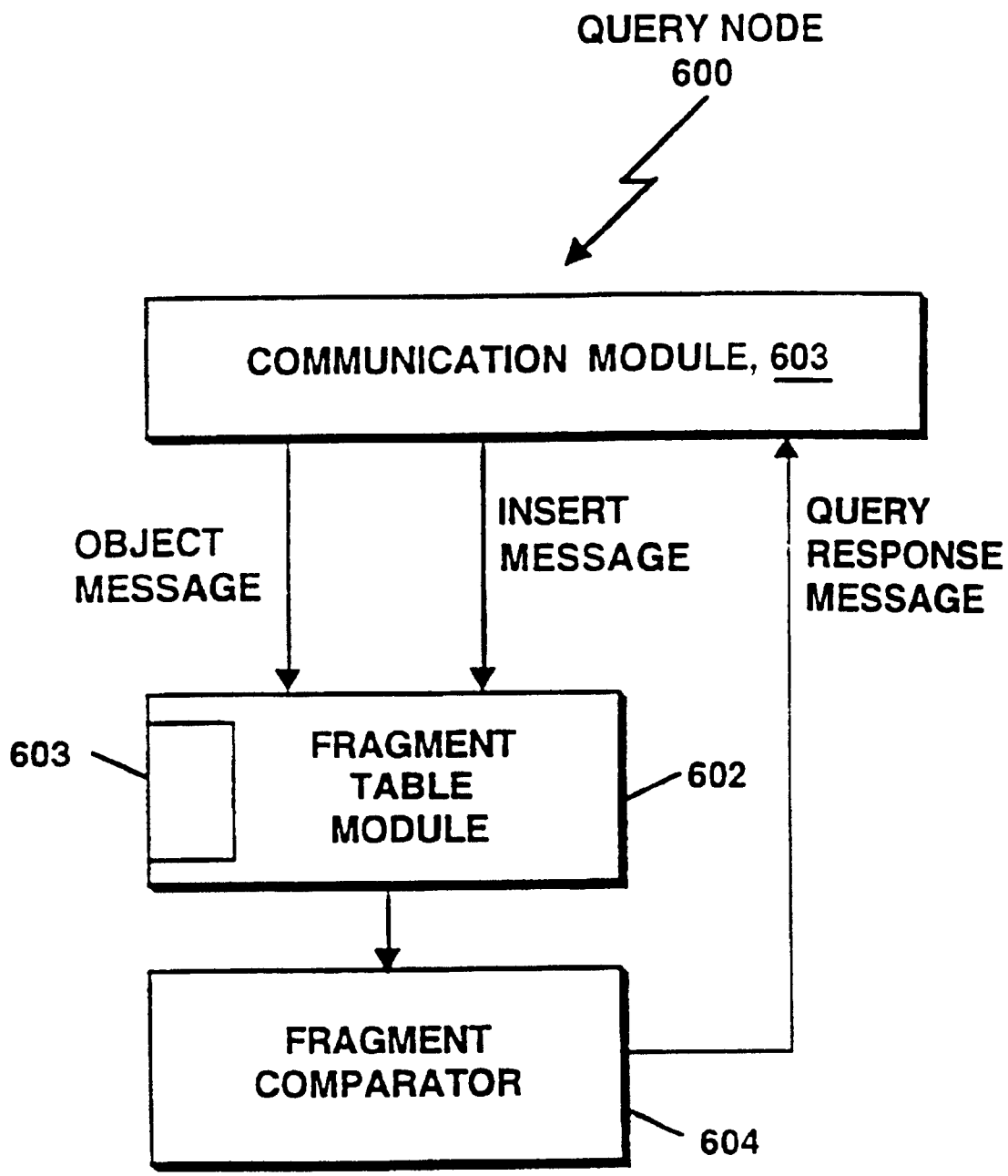
FIG. 6 is a block diagram of a representative one of the query nodes of FIGS. 1, 2 and 3 in accordance with an embodiment of the invention.

Referring to FIG. 6, a query node 600 can have a Fragment Table Module 602 that receives Query Messages and Insert Messages from a communication module 603. In the case of a Query Message, the Fragment Table Module 602 retrieves an entry in a local hash table 603 stored in memory using the hash value in the HQF field. The type specifier in the HQF field and the entry in the local hash table 603 are transferred to a Fragment Comparator 604. In the case of an Insert Message, the Fragment Table 602 modifies an entry in the local hash table 603 by inserting the OID and Value fields of the Insert Message to the entry in the local hash table 603.

The Fragment Comparator 604 receives entries from the Fragment Table 602. A comparison function is determined by the HQF type specifier that was transferred from the Fragment Table 602. The comparison function is used to determine the relevance of the OID and Value fields in the entry that was transferred from the Fragment Table 602. In one embodiment, the comparison function determines a similarity weight, and the OIDs having the highest similarity weight are deemed to be relevant. The relevant OIDs and their similarity weights are transferred to the Communication Module 603 using a Query Response Message.

Figure 7:
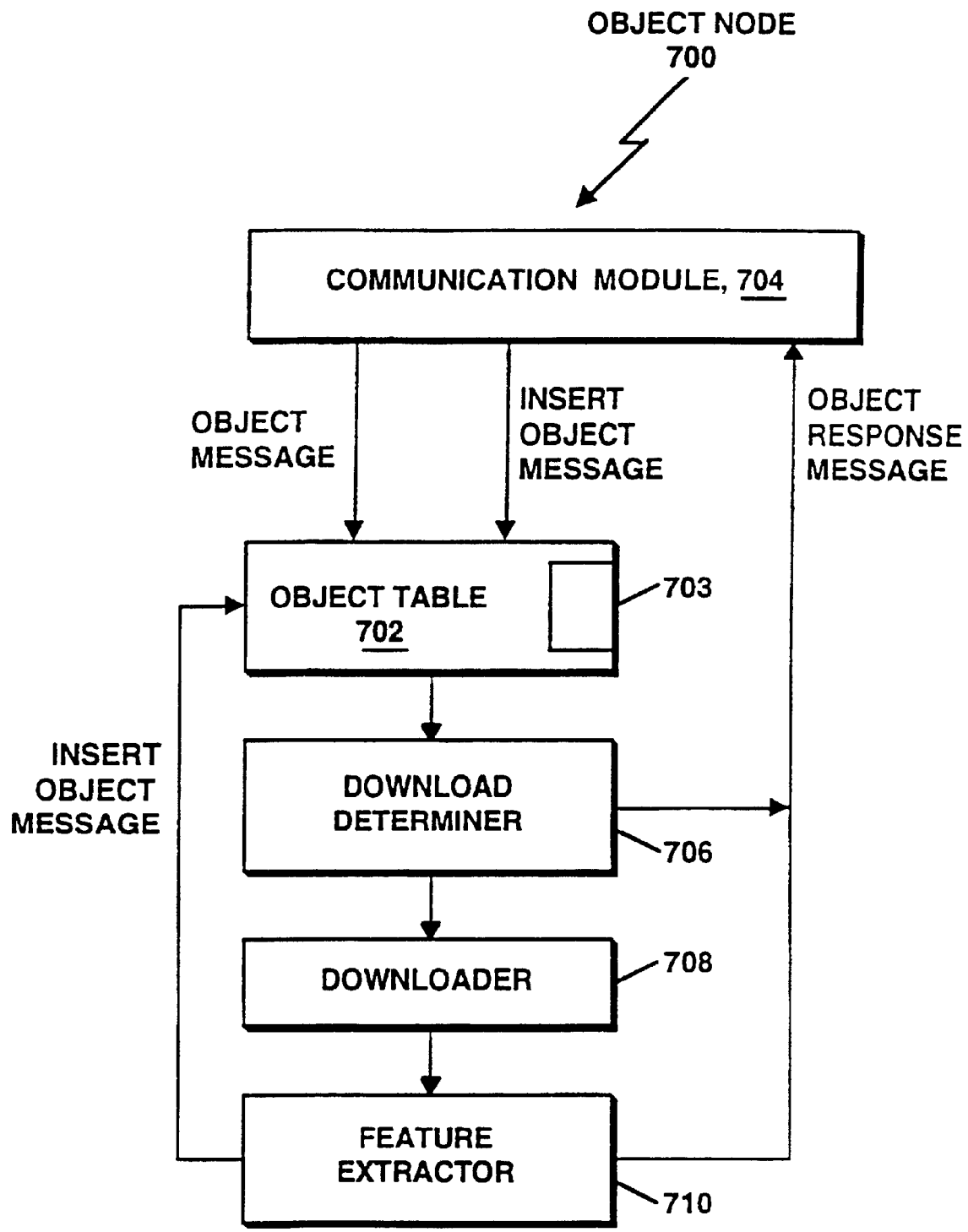
FIG. 7 is a block diagram of a representative one of the object nodes of FIGS. 1, 2 and 3 in accordance with an embodiment of the invention.

Referring to FIG. 7, an object node 600 can have an Object Table Module 702 that receives Object Messages and Insert Object Messages from a communication module 704. In the case of an Object Message, the Object Table Module 702 retrieves an entry in a local table 703 in memory using the object identifier in the OID field of the Object Message. The Object Message and the retrieved entry are transferred to the Download Determiner. In the case of an Insert Object Message, the Object Table Module 702 inserts a new entry in the local table 703. If an entry already exists for the specified object identifier, then the existing entry is replaced. The new or replacement entry contains the information in the Insert Object Message.

The Download Determiner 706 receives Object Messages and entries from the Object Table. It uses the TS field to determine whether the object should be downloaded using the Downloader. In one embodiment, the TS field is one bit whose value has two states corresponding to the two possibilities of downloading or not downloading. In another embodiment, the TS field is an expiration time. When the expiration time has been reached, the object is downloaded. Otherwise the object is not downloaded. If the Download Determiner 706 determines that the object should not be downloaded, then the Object Message and entry received from the Object Table Module 702 are transmitted to the Communication Module using an Object Response Message. If the Download Determiner 706 determines that the object should be downloaded, then the Object Message received from the Object Table module 702 is transferred to the Downloader 708.

The Downloader 708 receives an Object Message from the Download Determiner. The Downloader 708 uses the Location field of the Object Message to download the object. In one embodiment, the Downloader 708 uses the Hypertext Transfer Protocol (HTTP) to download a Web page specified by a Universal Resource Locator (URL). The downloaded object is transmitted to the Feature Extractor 710.

The Feature Extractor 710 extracts features from an object received from the Downloader 708. Feature extraction for images is performed by detecting edges, identifying the image objects, classifying the image objects as domain objects and determining relationships between domain objects. In another embodiment, feature extraction for images is performed by computing Fourier or wavelet transforms. Each Fourier or wavelet transform constitutes one extracted feature. The extracted features are transferred to the Object Table module 702 using an Insert Object Message, which causes an entry in the local object table to be replaced. The extracted features are also transmitted to the Communication Module 704 using an Object Response Message.

Figure 8:
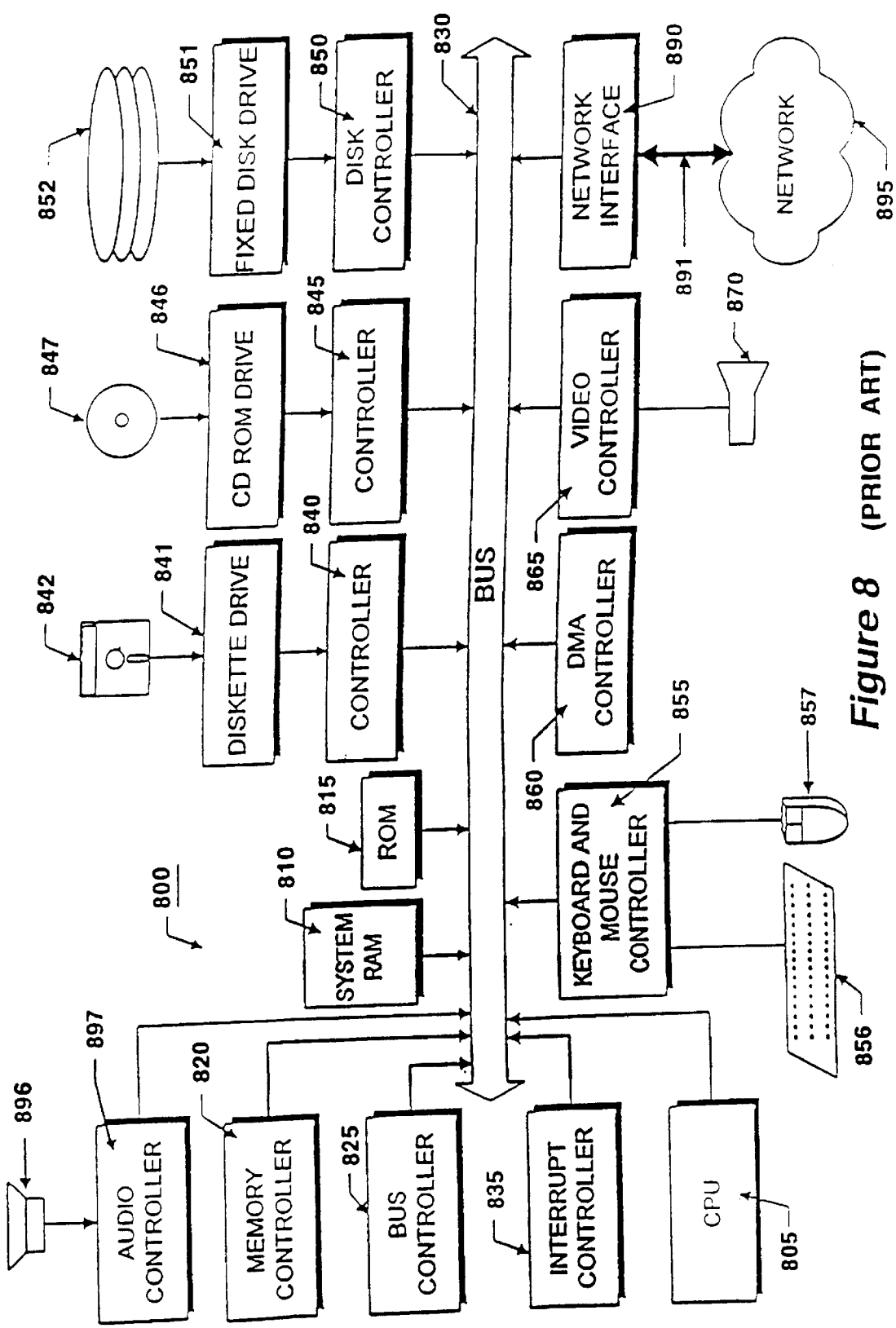
FIG. 8 is a block diagram of a computer system in accordance with an exemplary embodiment of each of the user computer, the front end computer, the home, query, and object nodes, and the external servers.

FIG. 8 illustrates a conventional system architecture for an exemplary computer system 800. Each of the user computer, front end computer and the computer nodes, including the home node, query node, object node, can be implemented as an instance of computer system 800. The exemplary computer system of FIG. 8 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 8.

The computer system 800 includes a central processing unit (CPU) 805, which may include a conventional microprocessor, random access memory (RAM) 810 for temporary storage of information, and read only memory (ROM) 815 for permanent storage of information. A memory controller 820 is provided for controlling system RAM 810. A bus controller 825 is provided for controlling bus 830, and an interrupt controller 835 is used for receiving and processing various interrupt signals from the other system components.

Mass storage may be provided by diskette 842, CD-ROM 847, or hard disk 852. Data and software may be exchanged with client computer 800 via removable media, such as diskette 842 and CD-ROM 847. Diskette 842 is insertable into diskette drive 841, which is connected to bus 830 by controller 840. Similarly, CD-ROM 847 is insertable into CD-ROM drive 846, which is connected to bus 830 by controller 845. Finally, the hard disk 852 is part of a fixed disk drive 851, which is connected to bus 830 by controller 850.

User input to the computer system 800 may be provided by a number of devices. For example, a keyboard 856 and a mouse 857 may be connected to bus 830 by keyboard and mouse controller 855. An audio transducer 896, which may act as both a microphone and a speaker, is connected to bus 830 by audio controller 897. It should be obvious to those reasonably skilled in the art that other input devices, such as a pen and/or tablet and a microphone for voice input, may be connected to client computer 800 through bus 830 and an appropriate controller. DMA controller 860 is provided for performing direct memory access to system RAM 810. A visual display is generated by a video controller 865, which controls video display 870.

Computer system 800 also includes a network adapter 890 that allows the client computer 800 to be interconnected to a network 895 via a bus 891. The network 895, which may be a local area network (LAN), a wide area network (WAN), or the Internet, may utilize general-purpose communication lines that interconnect multiple network devices.

Computer system 800 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readable media, e.g. the diskette 842, CD-ROM 847, ROM 815, or hard disk 852 of FIG. 8, or transmittable via a modem or other interface device, such as communications adapter 890 connected to the network 895 over a medium 891. Medium 891 can be either a tangible medium, including but not limited to optical or hard-wire communications lines, or may be implemented with wireless techniques, including but not limited to microwave, infrared or other transmission techniques. It may also be the Internet. When so transmitted, the software components can take the form of a digital signal embodied in a carrier wave. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims. Therefore, the invention should be construed as limited only as indicated by the scope of the claims.

What is claimed is:

1. A method for information retrieval using fuzzy queries in a distributed computer database system having a plurality of home nodes and a plurality of query nodes connected by a network, said method comprising the steps of:

A) selecting a first one of said plurality of home nodes;
   B) extracting, by said selected home node, a plurality of features from a query by a user;
   C) fragmenting, by said selected home node, each said extracted feature of said plurality of extracted features into a plurality of query fragments;
   D) hashing, by said selected home node, each said query fragment of said plurality of query fragments, said hashed query fragment having a first portion and a second portion;
   E) transmitting, by said selected home node, each said hashed query fragment of said plurality of query fragments to a respective one of said plurality of query nodes indicated by said first portion of each said hashed query fragment;
   F) using, by said query node, said second portion of said respective hashed query fragment to access data according to a local hash table located on said query node; and
   G) returning, by each said query node accessing data according to said respective hashed query fragment, a plurality of object identifiers corresponding to said accessed data to said selected home node.

2. The method of claim 1 further comprising, prior to the step of returning the said portion of the said plurality of object identifiers to said selected home node, the step of:

F1) applying a matching function to the said accessed data to select a portion of the said plurality of object identifiers, said matching function being specific to the type of the said query fragment.

3. The method of claim 1 further comprising, prior to the step of extracting features from said query, the step of:

A1) receiving, at said home node, said query from said user.

4. The method of claim 3 further comprising, subsequent to the step of returning said plurality of object identifiers, the steps of:

H) determining, by said home node, a measure of similarity between said accessed data and said query; and
   I) returning to said user, by said home node, accessed data having a predetermined degree of similarity.

5. The method of claim 4 wherein said measure of similarity is determined by a similarity function based on any of:

i) features possessed by both the said accessed data and the said query; and
   ii) features possessed only by the said query.

6. The method of claim 5 wherein for each feature of said plurality of features, said similarity function uses a function specific to the type of the said feature.

7. The method of claim 1 wherein step F) includes:

F1) using, by said query node, said second portion of said respective hashed query fragment to access the plurality of object identifiers according to a local hash table located on said query node, each said object identifier having a first portion and a second portion; and the method further comprises:

H) transmitting, by said selected home node, each said object identifier of said plurality of object identifiers to a respective one of a plurality of object nodes indicated by said first portion of each said object identifier;
   I) using, by said object node, said second portion of said respective object node to access data according to a local object table located on said object node; and
   J) returning, by each said object node accessing data according to said respective object identifier, object information comprising an object location and object features to said selected home node.

8. The method of claim 7 further comprising, prior to the step of returning the said portion of said plurality of object identifiers to said selected home node, the step of:

F2) applying a matching function to the said accessed data to select a portion of the said plurality of object identifiers, said matching function being specific to the type of the said query fragment.

9. The method of claim 7 further comprising, prior to the step of returning object information comprising an object location and object features to said selected home node, the steps of:
   I1) downloading, by said object node, the object identified by said respective object identifier, from an external server located by said accessed data, if said returned object information comprises stale information; and
   I2) extracting, by said object node, data from said object according to said query.

10. The method of claim 7 further comprising, prior to the step of extracting features from said query, the step of:
   A1) receiving, at said home node, said query from said user.

11. The method of claim 7 wherein said query from said user contains a time sensitivity requirement specification.

12. The method of claim 7 further comprising, subsequent to the step of returning said object information, the steps of:
   A) determining, by said home node, a measure of similarity between said accessed data and said query; and
   B) returning to said user, by said home node, accessed data having a predetermined degree of similarity.

13. The method of claim 7 further comprising, subsequent to the step of returning accessed data to said selected home node, the step of:
   I1) constructing, by said selected home node, a table containing, for each object of the plurality of objects, the said object location and said plurality of object features.

14. The method of claim 7 wherein said measure of similarity is determined by a similarity function based on any of:
   i) features possessed by both the said accessed data and the said query;
   ii) features possessed only by the said query; and
   iii) features possessed only by said accessed data.

15. The method of claim 7 wherein for each feature of said plurality of features, said similarity function uses a function specific to the type of the said feature.

16. A method of storing objects or locations of objects in a manner which is conducive to information retrieval using fuzzy queries in a distributed computer database system having a plurality of home nodes and a plurality of query nodes connected by a network, said method comprising the steps of:
   A) selecting a first one of said plurality of home nodes;
   B) extracting, by said selected home node, a plurality of features from an object submitted by a user;
   C) fragmenting, by said selected home node, each said extracted feature of said plurality of extracted features into a plurality of object fragments;
   D) hashing, by said selected home node, each said object fragment of said plurality of object fragments, said hashed object fragment having a first portion and a second portion;
   E) transmitting, by said selected home node, each said hashed object fragment of said plurality of fragments to a respective one of said plurality of query nodes indicated by said first portion of each said hashed object fragment; and
   F) using, by said query node, said second portion of said respective hashed object fragment to store data according to a local hash table located on said query node.

17. The method of claim 16 further comprising, prior to the step of extracting features from said object, the step of:
   A1) receiving, at said home node, said object from said user.

18. The method of claim 16 wherein the distributed computer database system includes a plurality of object nodes, and the method further comprises:
   G) selecting, by said selected home node, a unique object identifier for an object selected by a user, said object identifier having a first portion and a second portion;
   H) using the first portion of said object identifier to select one of said plurality of object nodes;
   I) transmitting, by said selected home node, the location of the said object, the said plurality of object features of the said object to a respective one of said plurality of object nodes indicated by said first portion of each object identifier; and
   J) using, by said object node, said second portion of said object identifier to store data according to a local object table located on said object node.

19. A distributed computer database system having an information retrieval tool for handling queries from a user comprising:
   A) a plurality of home nodes; and
   B) a plurality of query nodes;
   C) said plurality of home nodes and said plurality of query nodes connected by a network;
   D) wherein each said home node, upon receiving a query from a user, extracts a plurality of features from said query, fragments each said query feature of said plurality of query features into a plurality of query fragments, hashes each said query fragment of said plurality of query fragments into a hashed query fragment having a first portion and a second portion, and transmits each said hashed query fragment to a respective one of said plurality of query nodes indicated by said first portion of said hashed query fragment, and
   E) further wherein each said query node uses said second portion of said hashed query fragment to access data according to a local hash table located on said query node and returns a plurality of object identifiers corresponding to said accessed data to said home node.

20. The distributed computer database system of claim 19 wherein said query node applies a matching function to the said accessed data to select a portion of the said plurality of object identifiers, said matching function being specific to the type of the said query fragment.

21. The distributed computer database system of claim 19 wherein said home node determines a measure of similarity between said accessed data and said query and returns to said user accessed data having a predetermined degree of similarity.

22. The distributed computer database system of claim 19 wherein said home node measures similarity using a similarity function determined by:
   A) features possessed by both the said accessed data and the said query; and
   B) features possessed only by the said query.

23. The distributed computer database system of claim 19 wherein for each feature of said plurality of features, said similarity function uses a function specific to the type of the said feature.

24. A distributed computer database system for storage and retrieval of information objects or locations of information objects, comprising A) a plurality of home nodes; and B) a plurality of query nodes;

C) said plurality of home nodes and said plurality of query nodes connected by a network; and D) wherein each said home node, upon receiving an object from a user, extracts a plurality of features from said object, fragments each said object feature of said plurality of object features into a plurality of object fragments, hashes each said object fragment of said plurality of object fragments into a hashed object fragment having a first portion and a second portion, and transmits each said hashed object fragment to a respective one of said plurality of query nodes indicated by said first portion of said hashed object fragment, and wherein each said query node uses said second portion of said hashed object fragment to store objects or locations of objects according to a local hash table located on said query node.

25. An information retrieval apparatus for processing a query for word based and non-word based retrieval of information from a database, comprising:

A) a mechanism for extracting a number of features from the query;

B) a mechanism coupled with the extracting mechanism for fragmenting each of the features into feature fragments; and C) a mechanism coupled with the fragmenting mechanism for hashing each of the feature fragments into hashed feature fragments for use in accessing a hash table for obtaining object identifiers therefrom for use in obtaining information from the database relevant to the query.

26. A computer program product for processing a query for word based and non-word based retrieval of information from a database, the computer program product comprising a computer-executable program embodied on a computer-readable medium, the computer-executable program comprising:

A) a first code portion for extracting a number of features from the query;

B) a second code portion for fragmenting each of the features into feature fragments; and C) a third code portion for hashing each of the feature fragments into hashed feature fragments for use in accessing a hash table for obtaining object identifiers therefrom for use in obtaining information from the database relevant to the query.

27. An information indexing system for indexing information for facilitated retrieval from a database, the system comprising:

A) a mechanism for extracting a number of features from the information;

B) a mechanism for fragmenting each of the features into feature fragments; and

C) a mechanism for hashing each of the feature fragments into hashed feature fragments for use in accessing a hash table for storing object identifiers specifying the information at locations thereof determined by the hashed feature fragments.

28. A computer program product for indexing information for facilitated retrieval from a database, the computer program product comprising a computer-executable program embodied on a computer-readable medium, the computer-executable program comprising:

A) a first program code portion for extracting a number of features from the information;

B) a second program code portion for fragmenting each of the features into feature fragments; and C) a third program code portion for hashing each of the feature fragments into hashed feature fragments for use in accessing a hash table for storing object identifiers specifying the information at locations thereof determined by the hashed feature fragments.

* * * * *